(12) United States Patent
French et al.

(10) Patent No.: US 7,600,716 B2
(45) Date of Patent: Oct. 13, 2009

(54) REINFORCED DOOR

(75) Inventors: Clive French, Nottingham (GB); Smail Maksen, Grenade (FR)

(73) Assignees: Airbus, Blagnac (FR); Airbus Deutschland GmbH, Hamburg (DE)

( * ) Notice: Subject to any disclaimer, the term of this patent is extended or adjusted under 35 U.S.C. 154(b) by 0 days.

(21) Appl. No.: 11/189,882

(22) Filed: Jul. 27, 2005

(65) Prior Publication Data

US 2006/0065782 A1 Mar. 30, 2006

Related U.S. Application Data

(60) Provisional application No. 60/606,529, filed on Sep. 2, 2004.

(30) Foreign Application Priority Data

Aug. 3, 2004 (FR) .................................. 04 08580

(51) Int. Cl.
B64C 1/14 (2006.01)

(52) U.S. Cl. .................... 244/129.5; 296/146.1; 49/61; 49/504; 160/130

(58) Field of Classification Search .............. 244/129.4, 244/129.5, 118.5; 52/455, 456, 457, 458; 49/464, 61, 62, 504; 296/146.1; 160/160, 160/162, 130, 229.1
See application file for complete search history.

(56) References Cited

U.S. PATENT DOCUMENTS

| 3,168,135 | A | * | 2/1965 | Beifuss ..................... 160/229.1 |
| 3,566,564 | A | * | 3/1971 | Gaeth et al. .................... 52/232 |
| 4,296,791 | A | * | 10/1981 | Chaumat et al. ............ 160/206 |
| 4,597,549 | A | * | 7/1986 | Ryan ........................ 244/118.5 |
| 4,867,221 | A | * | 9/1989 | Dixon et al. ............. 160/84.08 |
| 4,899,960 | A | | 2/1990 | Hararat-Tehrani et al. |
| 4,912,877 | A | * | 4/1990 | Strydom ....................... 49/171 |
| 5,085,017 | A | | 2/1992 | Hararat-Tehrani |
| 5,236,392 | A | * | 8/1993 | Fauciglietti ................... 52/455 |
| 5,392,834 | A | * | 2/1995 | Borgardt ..................... 160/118 |
| 5,560,658 | A | * | 10/1996 | Coolman et al. .............. 292/28 |
| 5,573,053 | A | | 11/1996 | Hanemaayer |
| 5,762,123 | A | * | 6/1998 | Kuyama et al. ............. 160/195 |
| 5,833,293 | A | | 11/1998 | Ludwig |
| 5,875,608 | A | * | 3/1999 | Quinif ...................... 52/784.14 |
| 5,875,609 | A | * | 3/1999 | Quinif ...................... 52/784.14 |
| 5,911,660 | A | * | 6/1999 | Watson ........................ 52/202 |
| 5,992,127 | A | * | 11/1999 | Quinif ...................... 52/784.14 |
| 6,082,499 | A | * | 7/2000 | O'Donnell .................. 187/324 |
| 6,257,523 | B1 | * | 7/2001 | Olliges .................... 244/118.5 |
| 6,283,189 | B1 | * | 9/2001 | Liebscher ....................... 160/9 |
| 6,588,705 | B1 | * | 7/2003 | Frank ....................... 244/118.5 |

(Continued)

FOREIGN PATENT DOCUMENTS

CN 2628699 7/2004

(Continued)

*Primary Examiner*—Michael Carone
*Assistant Examiner*—Benjamin P Lee
(74) *Attorney, Agent, or Firm*—Oblon, Spivak, McClelland, Maier & Neustadt, L.L.P.

(57) ABSTRACT

A reinforced door for an aircraft includes a frame and a network of harnesses. The frame includes components. The network of harnesses links a majority of the components and reinforces the frame. The harnesses are laid out onto the frame and linked to one another to form a webbing.

11 Claims, 9 Drawing Sheets

U.S. PATENT DOCUMENTS

| | | | |
|---|---|---|---|
| 6,698,690 B2 * | 3/2004 | Novak et al. | 244/121 |
| 6,702,230 B2 * | 3/2004 | Movsesian et al. | 244/118.5 |
| 6,820,675 B2 * | 11/2004 | Nakatani | 160/118 |
| 6,945,497 B2 * | 9/2005 | Saku et al. | 244/129.5 |
| 6,976,658 B2 * | 12/2005 | Sekikawa et al. | 244/118.5 |
| 2003/0141022 A1 * | 7/2003 | Nakatani | 160/118 |
| 2003/0160130 A1 | 8/2003 | Novak et al. | |
| 2003/0192989 A1 * | 10/2003 | Owen et al. | 244/118.5 |
| 2004/0094670 A1 | 5/2004 | Pratt et al. | |
| 2005/0247823 A1 * | 11/2005 | Wood et al. | 244/129.5 |
| 2006/0048449 A1 | 3/2006 | Roques et al. | |
| 2006/0169839 A1 | 8/2006 | French | |

FOREIGN PATENT DOCUMENTS

| | | |
|---|---|---|
| EP | 1440884 | 7/2004 |
| FR | 2 848 179 | 6/2004 |
| GB | 2 381 551 | 5/2003 |
| WO | 03/106796 | 12/2003 |

* cited by examiner

REINFORCED DOOR

BACKGROUND OF THE INVENTION

I. Field of the Invention

This invention involves an interior security door for an aircraft.

II. Description of Related Art

Following the Sep. 11, 2001 attacks, measures have been taken to increase security of aircraft cockpits. These measures have among other involved the door separating the cockpit of an aircraft from its cabin. According to new standards, this door must form a barrier preventing any intrusion into the cockpit and entry into the cockpit must now be limited only to navigating personnel.

As in the past, these cockpit doors must however open automatically when a depression occurs, either on the cabin side or on the cockpit side.

The purpose of this invention is to increase security on board of an airplane by making access to the cockpit even more difficult to an intruder.

It has been noticed that in spite of the presence of security systems preventing the opening of a door, the latter is opened to let for instance the pilot or the co-pilot pass through and an intruder can make use of such opening to get into the cockpit because security devices are not operating at that time. As such, one of the weak points of present cockpit doors is that these are sometimes open during flight, such as for a long carrier flight. An original idea at the basis of the invention is to prevent passengers to whom access to the cockpit is prohibited, from knowing when the cockpit door is open.

In certain aircraft, the cockpit door is located at the end of an aisle that serves a space essentially used by navigating personnel and where toilets are usually located. Certain airline companies accept that these toilets be used by passengers.

The idea at the origin of this invention is to close off this aisle by a second door on the cabin side. The main purpose of this second door is to be a visual barrier preventing the passenger from seeing whether the door is open or closed.

A solution consists of providing a curtain at the end of the aisle opposite the cockpit door. This solution may be appropriate but it is clear that it is not very dissuasive for an aggressor.

BRIEF SUMMARY OF THE INVENTION

As such, the invention aims to provide a rigid barrier in the form of a door, to close off the aisle behind the cockpit door but that can also be used at other locations within an aircraft.

In case of depression, it is necessary that on either side of this door, this one remains in one piece. Indeed, if it breaks into several pieces, these pieces will then form dangerous projectiles for the persons on board of the aircraft. Preferably, this door shall be light. Indeed, like all elements on board of an aircraft, one looks to limit the carried weight. Finally, when this door is used to close off the aisle behind the cockpit, it shall equally and beneficially form a door that is difficult to pass by an aggressor.

For this purpose, it proposes a reinforced door for an aircraft comprising components that form an internal structure.

According to the invention, the internal structure is reinforced by a network of harnesses of webbing linking most of the components that form the internal structure.

This network of harnesses permits first of all to strengthen the door structure. This reinforcement greatly permits diminishing the weight of the door to equivalent mechanical resistance with respect to a traditional door construction. Then, in case of breakage at the level of the frame, the harnesses enable retaining the broken parts of the doors and thus ensure door cohesion. Finally, in case of aggression, the harnesses form an additional barrier that the aggressor must overcome.

In a preferred way of construction, the harnesses have the form of straps glued onto the inner structure. This solution is easy to implement and enables to secure the network of harnesses to the internal structure.

The harnesses are beneficially made of high strength composite fibers, such as carbon fibers. This material has the advantage on the one hand of having excellent mechanical features and on the other hand of being light.

To increase the efficiency of the network with respect to the cohesion between the door and the barrier formed against an aggressor, the harnesses are preferably located onto the internal structure and linked among each other so that it forms a webbing.

In one form of construction, the reinforced door according to the invention is such that its internal structure comprises at least three vertical risers linked by horizontally arranged link pieces. In this form of construction, the harnesses are located over their full length along vertical risers and horizontal link pieces. As such, the harnesses do no penetrate into the compartments formed by spaces left free between the risers and the link pieces. These compartments can then be equipped with "ejectable" panels without an risk of the network of harnesses being affected by the panel ejection.

BRIEF DESCRIPTION OF THE DRAWINGS

Details and advantages of this invention will come out more from the description that follows, with reference to the attached schematic drawing, on which.

DETAILED DESCRIPTION OF THE INVENTION

Figure 1:
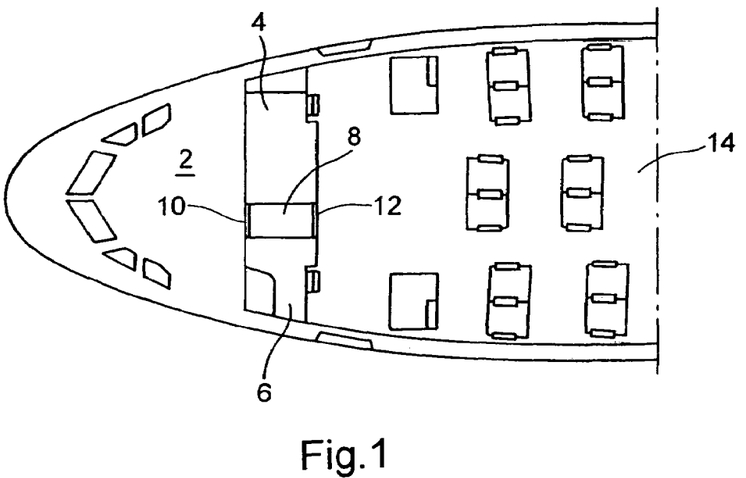
FIG. 1 is a view from above as a partial cross section of the front part of the aircraft.

On FIG. 1, one observes a cockpit 2 of a long carrier airplane. Immediately behind the cockpit, there is a space used in particular by the crew. This space includes on the one side a rest area 4 comprising for instance sleeping areas and on the other hand, bathrooms 6 comprising toilets, a wash basin and a shower. An aisle 8 is provided between the rest area 4 and bathrooms 6 to permit access to cockpit 2. In a classic design, a door 10 closes off the cockpit 2 and permits to access it.

Cockpit door 10 closes off aisle 8 at one of its ends. In an original design, it is proposed to provide a second door 12 at the other end of aisle 8.

The second door 12 has two main functions. A first function is to hide cockpit door 10 from the passengers' view. For this first function, this second door 12 can be placed in an intermediate position in aisle 8 or else at the end of this aisle 8 opposite cockpit door 10. Another function of this second door is to provide privacy to the area reserved for the crew. For this second function, second door 12 is preferably located at the end of aisle 8 opposite cockpit door 10, as shown on FIG. 1.

For security reasons, cockpit door 10 is locked during flight and means (access code, badge, . . . ) are provided to attempt preventing access to the cockpit by any non-authorized individual. This cockpit door 10 is also bullet proof. However, in the event of a depression in cabin 14 of the aircraft, means permit the automatic opening of this door so as to equilibrate the pressures between cabin 14 and cockpit 2 and thus prevent excessive stress on the aircraft structure.

Second door 12 must not disturb operation of cockpit door 10, such as when a depression occurs in cockpit 2.

Figure 2:
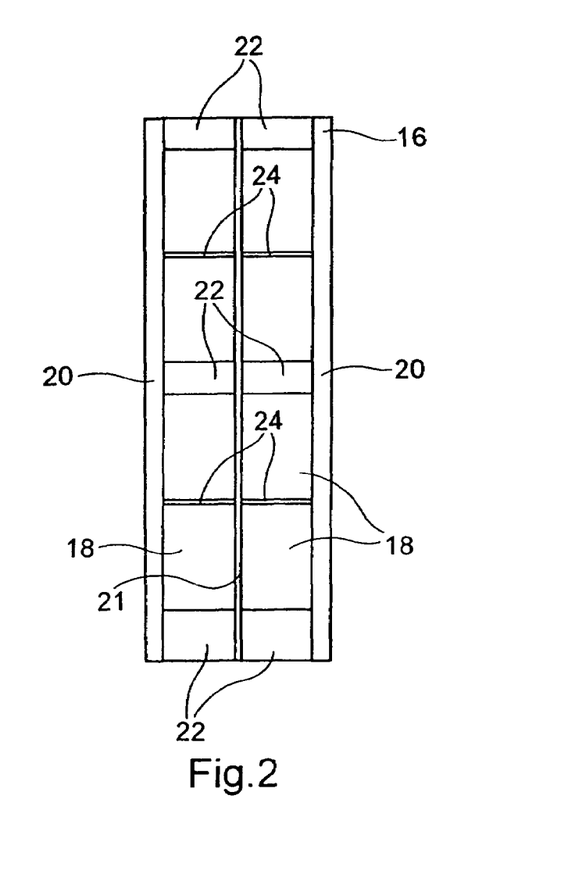
FIG. 2 is a front view of a door according to the invention.

FIG. 2 shows a frontal view of a preferred form of construction to manufacture second door 12 represented by FIG. 1. This door comprises an internal structure called frame 16 in the remainder of the description. Eight panels 18 are mounted in this frame 16.

Frame 16 comprises two lateral posts 20 and one central post 21 linked by three torsion boxes 22, one top box, one median box and one box at the bottom. Likewise, among the top and median boxes on the one hand and the median and bottom boxes on the other hand, the frame presents two openings. Each of these openings is also divided each time by means of a cross-strut 24 so that the frame is formed of eight compartments each receiving a panel 18. These eight compartments are distributed in two columns of four. Each compartment receives a panel 18 shown in greater detail on FIGS. 3 and 4.

Hereinafter, to describe second door 12, one considers that it is in its closed position. One considers then that the front face of the door is the face turned towards cockpit 2 and the rear face of this door is the one turned to cabin 14, when second door 12 is in its closed position as shown on FIGS. 1 and 3. The adjectives "inner" and "outer" refer to second door 12.

Figures 3, 4, 5:
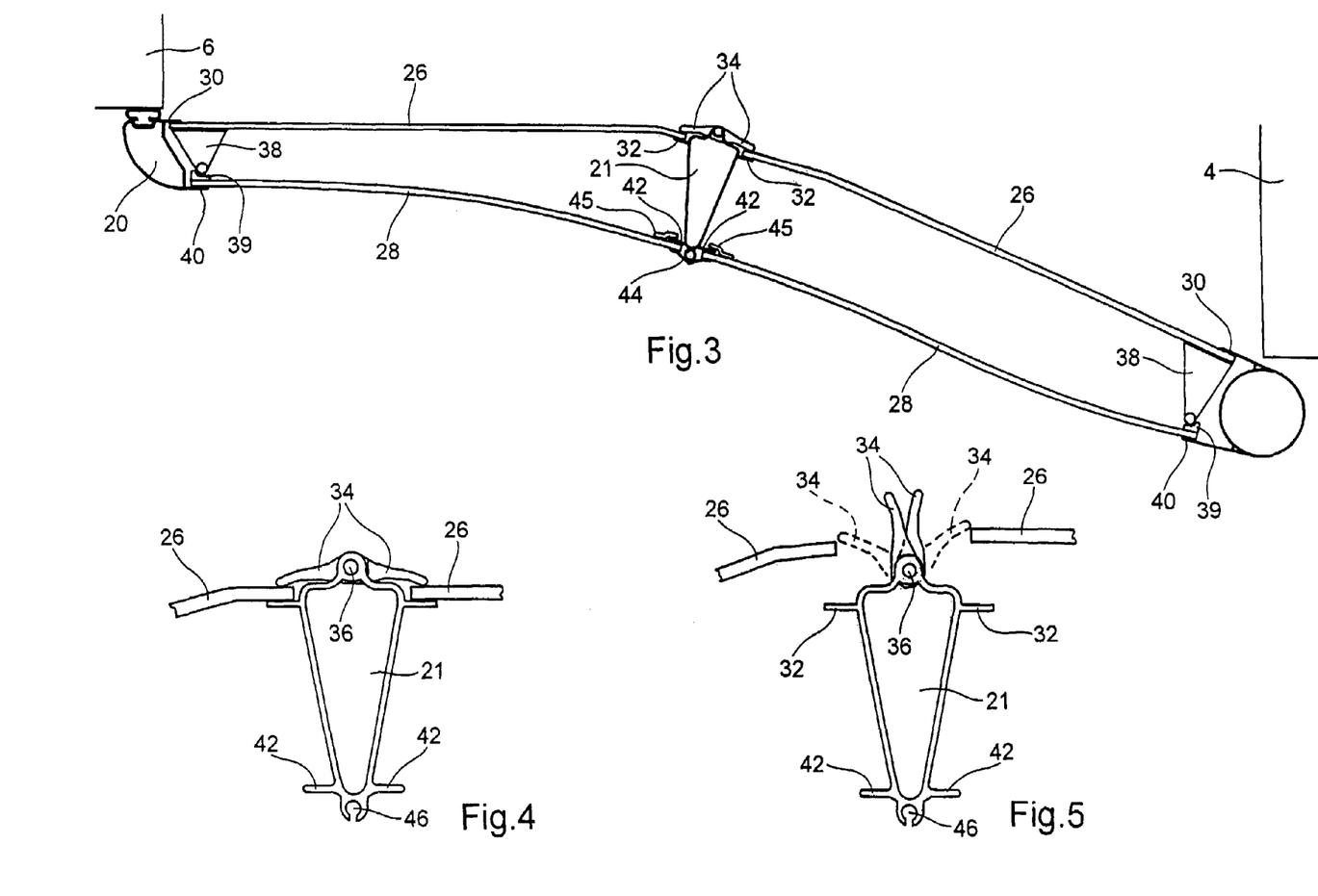
FIG. 3 is a view as a horizontal cross-section according to the sectional line III-III of FIG. 2, at an enlarged scale.
FIG. 4 is a detailed view of the release mechanism shown on FIG. 3 in the locked position.
FIG. 5 shows the mechanism of FIG. 4 in the unlocked position.
Figure 6:
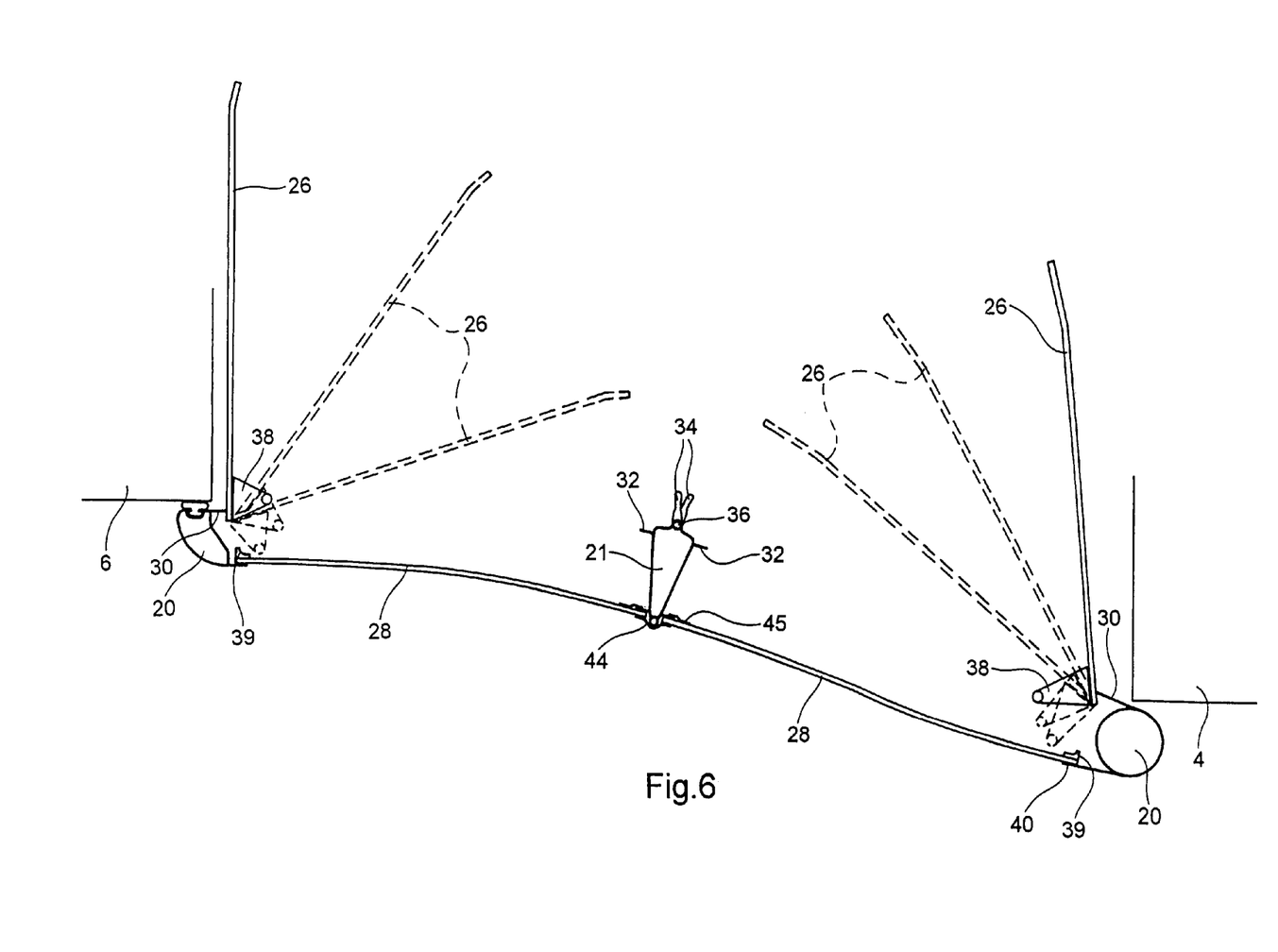
FIGS. 6 to 8 are views corresponding to that of FIG. 3 when a depression appears in the aircraft cockpit.

Each panel 18 comprises two plates: one front plate 26 and one rear plate 28.

Front plate 26 rests against the inner face of a first edge 30 connected to a lateral post 20 as well as against the outer face of a second edge 32 of central post 21. The first and second edges 30, 32 extend for instance over the full height of the compartment receiving panel 18. The top and bottom edges of the front plate 26 are preferably free.

The front plate 26 is held onto the second edge 32 by means of pivoting latches 34. Each latch 34 is mounted on a pin 36. A spring, not shown, prestresses latch 34 against the top face of the front plate 26 to maintain it against second edge 32. A similar pin 36 can be used to maintain latches 34 acting on the two front plates 26 of panels of two adjacent compartments.

On the side of side post 20, front plate 26 is held by a spacer 38 as shown hereinafter. Lateral post 20 shows a third edge 40 that is facing first edge 30. Rear plate 28 is supported by the inner face of this third edge 40. Spacer 38 wedges front plate 26 and rear plate 28 against respectively the first and third edges 30, 40. A wedge 39 is arranged between rear plate 28 and spacer 38. The form of this wedge 39 is adjusted on one side to the form—considerably flat—of rear plate 28 and on the other side to the form of spacer 38.

The distance separating the two edges 38 and 40 thus corresponds to the thickness of front plate 26 added to the thickness of rear plate 28 and to the height of the assembly formed by space 38 and wedge 39. Spacer 38 shows for instance the form of a U iron of which the base is secured to the inner face of front plate 26. The branches of this U iron are resting against wedge 39 that is connected to rear plate 38.

It is described above how the vertical edge of rear plate 28 is maintained along vertical post 20. On the side of central post 21, the edge of rear plate 28 is resting against a fourth edge 42 on its outer face. This edge of rear plate 28 is maintained against fourth edge 42 using a small bar 44 that clicks into the central post 21. On FIGS. 4 and 5, one observes a housing 46 used for clicking small bar 44 (visible on FIG. 3). Also, on FIGS. 3 and 6 to 8, one observes that rear plates 28 are provided with fingers 45 permitting maintaining these plates against edge 42.

FIGS. 5 to 8 show the behavior of panels 18 when a depression occurs in the front of the airplane, for instance, in cockpit 2, in other words, on the side of the front face of second door 12.

In such case, when second door 12 is closed, it is sucked towards the inside of aisle 8. Frame 16 of second door 12 is rigid and is scheduled to withstand such a depression. Second door 12 is designed in such a way that panels 18 give away and are sucked inside aisle 8.

Figure 7:
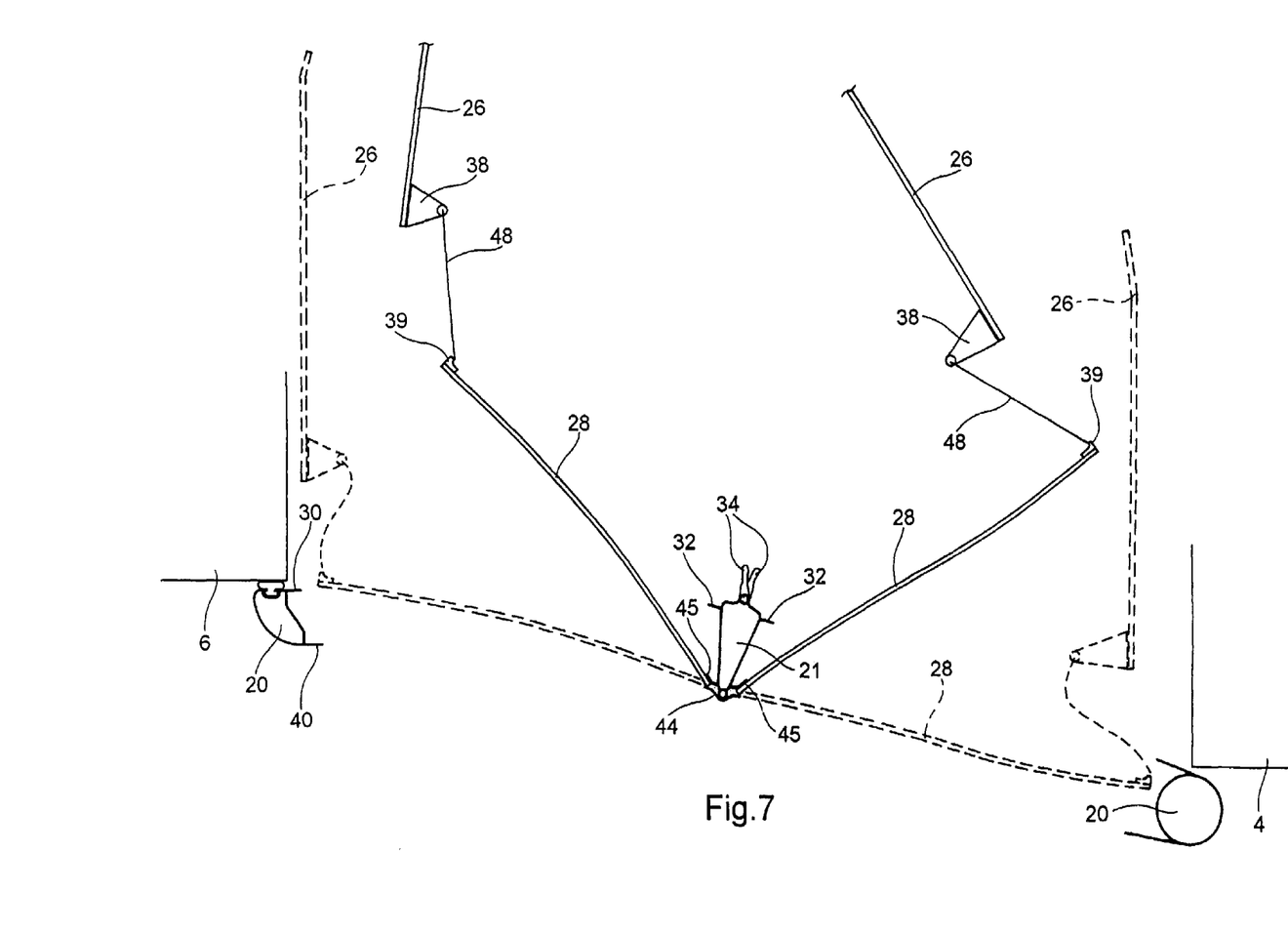

In a first instance, the front plate 26 of each panel 18 is sucked inside aisle 8. First edge 30 is stationary. On the other hand, latches 34 pivot. When the force exercised on latch 34 is sufficient (each latch 34 is pre-stressed by a spring), latch 34 pivots and releases front plate 26 of panel 18. Then, this plate pivots around first edge 30 and pulls spacer 38 with it. This then rolls onto wedge 39 for which the form is adjusted to facilitate the disengagement of spacer 38. The edge of rear plate 28 that was resting against third edge 40 is then released and rear plate 28 starts to pivot with respect to fourth edge 42 (FIG. 7). Fingers 45 permit controlling this pivoting movement by maintaining the edge of rear plate 28 supported against fourth edge 42. A link 48 which for instance may be a cable, a harness, a strip or similar, links front plate 26 to rear plate 28. This link 48 is for instance secured to spacer 38 on the one hand and on wedge 39 on the other hand.

Figure 8:
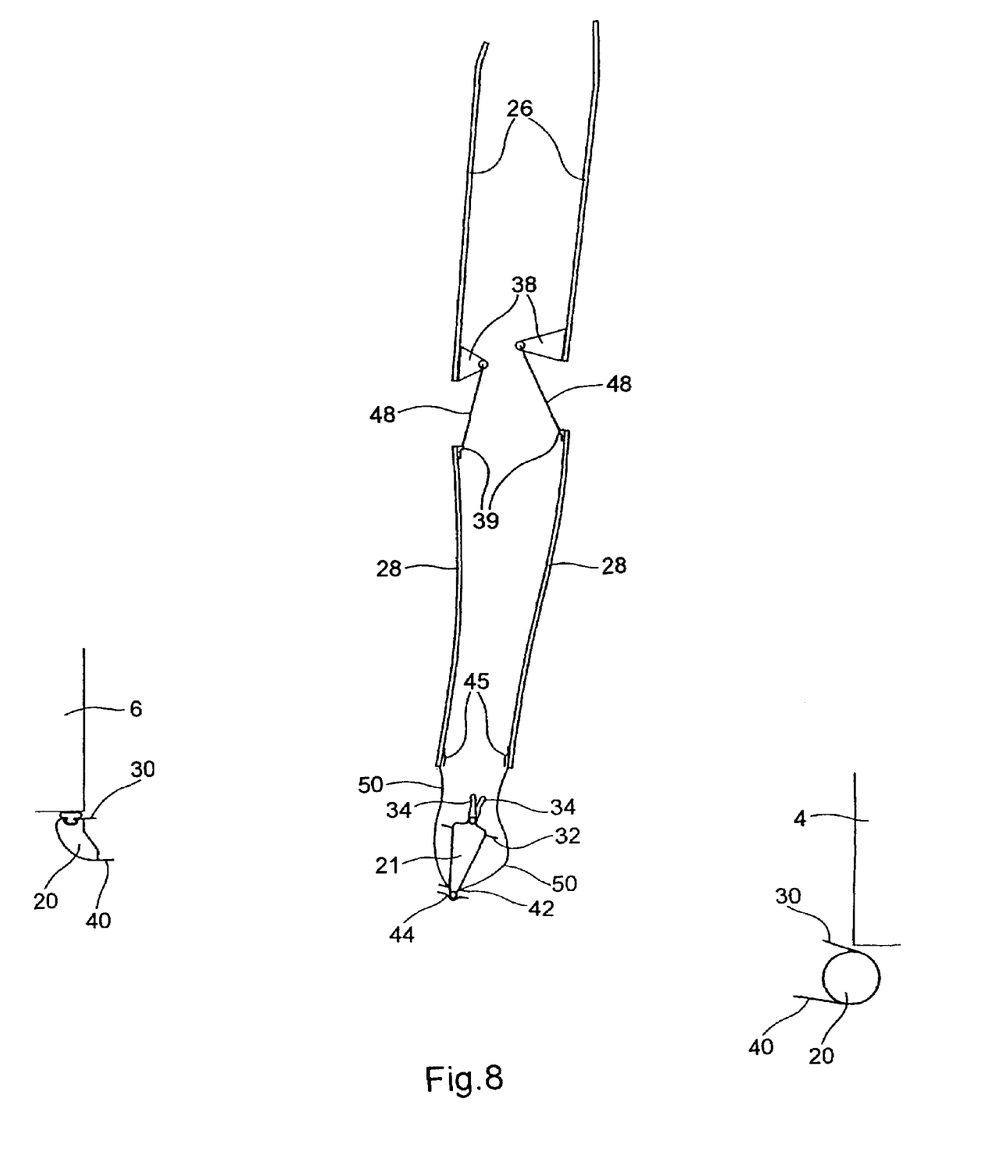

FIG. 8 shows two panels 18 that are fully open. One observes on this figure a second link 50 (for instance similar to link 49) that links rear plate 28 of each panel 18 to central post 21. Plates 26 and 28 are thus retained and do not become projectiles that could hit (and possibly kill) a member of the crew.

The eight panels 18 open simultaneously. Indeed, they are exposed to the same depression and as such react in the same way. When the panels are fully open (FIG. 8), only frame 16 of second door 12 is opposed to the back-to-front air flow associated with the depression caused at the level of cockpit 2. This frame 16 offers little resistance to the flow and the corresponding load loss is negligible (as are the stresses exerted on the aircraft structure). Second door 12 described above thus permits not disturbing the operation of cockpit door 10 in case of depression in the front of the plane, in cockpit 2.

One observes from the description above and corresponding FIGS. 3 to 8 that the system proposed for releasing panels 18 is a system that can be reset. Indeed, once the panels are removed from their compartments, they can be put back in place without a problem. It suffices to put first of all rear plate 28 back in place in its compartment, in position against edges 42 and 40, then, to put front plate 26 back against edges 30 and 32 before making the latches 34 pivot, thus resetting the corresponding springs (not shown).

The force of the springs acting on the pivoting latches 34 is determined on the basis of the admissible load on second door 12. One can estimate that the maximum depression at second door 12 is around 150 hPa. When such depression exists, the panels have already been released. The force that is exerted then onto second door 12 corresponds to the surface of the frame multiplied by the pressure exerted. To limit the forces exerted against second door 12, one can assume that this force is the maximum admissible force. If $P_{deci}$ is the value of the depression corresponding to the release of panels 18, one provides that the $P_{deci}$ multiplied by this total surface area of second door 12 is less than the maximum force exerted on the door and calculated previously. The springs acting on pivoting latches 34 are then set on the basis of the $P_{deci}$ value selected, of the surface area of corresponding panel 18 as well as of the number of pivoting latches 34 per panel.

One observes in the above description that the panels are released on the side of central post 21 and that once released, these panels, by virtue of the proposed structure, are considerably in the middle of aisle 8. This permits first of all regrouping of the panels and preventing that there are any on the two edges of the aisle. The main reason for this regrouping of panels towards the center of aisle 8 is however different. When a depression occurs in cockpit 2, it spreads towards aisle 8. By reason of the depression, the modules, also called monuments, located on either side of aisle 8 have the tendency of coming together, thus reducing the width of aisle 8. These monuments can then be deformed to the point that they cover the vertical edges of second door 12. Then, if panels 18 would release at lateral posts 20, this release could be hampered, or even prevented, by the monuments. Second door 12 would then form a barrier that would prevent equilibrating the pressures inside the plane. As we have seen above, this must be avoided. According to the position of the monuments found in aisle 8 with respect to the second door, one must possibly avoid arranging the latches (or other means of release) on the vertical lateral posts and place them towards the center of the door.

In case of depression at the level of cabin 14 of the plane, one can for instance provide for the opening of second door 12. This opening would cause loads due to the centrifugal force exerted by the movement of the door on the upper and lower securing points of the door on the plane.

As indicated above, the structure of panels 18 described permits through the successive release of the front plates and then the rear plates to permit the air passage as soon as a depression appears in cockpit 2. However, the structure described is such that when one pushes against panels 18 from cabin 14 towards the cockpit, in other words from the back to the front, the panels resist and do not release from frame 16.

Indeed, when looking at FIG. 3, one observes that each rear plate 28 is retained by stationary elements as long as the corresponding front plate 26 is in place. One observes on the figure that on one hand, each rear plate 28 is resting against a stationary fourth edge 42 and on the other hand is resting through a wedge 39 and a spacer 38 against a stationary first edge 30. As such, if an effort is exerted from the back to the front on rear plate 28, this effort is fully picked up by edges 42 and 30. The effort exerted does not act on the pivoting latches that my release applicable panel 18.

Figure 9:
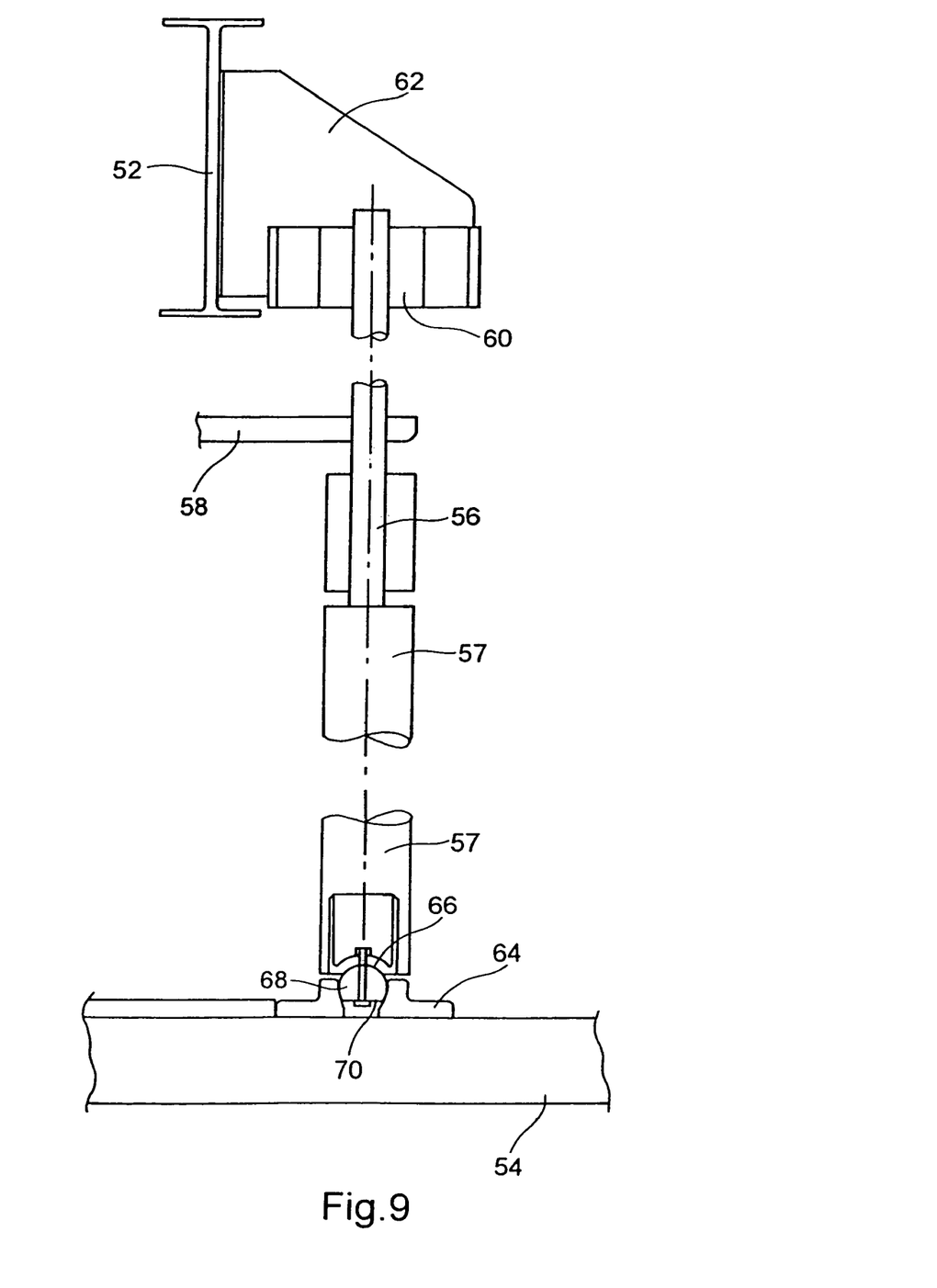
FIG. 9 is an elevated view of the structure carrying the door of FIG. 2.

As an example, FIG. 9 shows a possible installation of the door on the plane structure. One observes on this figure an upper beam 52 and a lower beam 54. One also observes a pin around which pivots the door as well as ceiling 58 of cabin 14 and aisle 8. This pin is made of two parts: a lower tube 56 inside which a circular cylindrical arm 57 can slide telescopically. A locking system, for instance a bayonet type system is foreseen to lock the pieces, such as by translation, one with respect to the other.

Arm 57 forms the top part of pin 56 of second door 12. It is mounted while pivoting in a stationary bearing 60 by a corner iron 62 on upper beam 52.

The bottom part of the door pin, consisting of tube 56, is mounted on a self-aligning bearing. This bearing also includes a stationary support 64 on bottom beam 54. This support 54 includes a housing with a spherical seat 66. A ball 68 for which the diameter corresponds that that of spherical seat 66, possibly showing a flat spot 70, is secured for instance through screwing, to the bottom end of tube 56. The latter presents, in a preferred form of construction, a spherical seat for receiving ball 68. This ball 68, when being placed in spherical seat 66 of support 64 permits the automatic alignment of the door pin during the installation of support 64 onto the aircraft floor, in other words, on bottom beam 54.

The telescopic pin of second door 12 permits a very easy assembly and disassembly of this door. For the assembly, arm 57 is slid inside tube 56. Once tube 56 is in place on ball 68, the door pin is turned to face considerably bearing 60. Arm 57 is then taken out and locked in the out position. Disassembly takes place easily by conducting installation operations in the opposite sequence.

Figure 12:
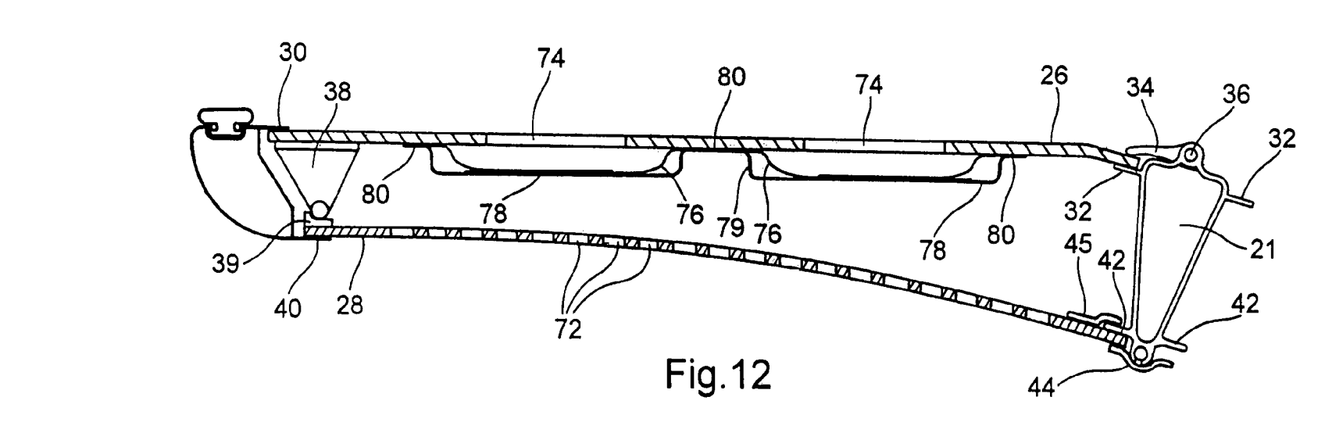
FIGS. 12 and 13 are enlarged scale views corresponding to the view of FIG. 3, showing an improvement of a door panel according to the invention.
Figure 13:
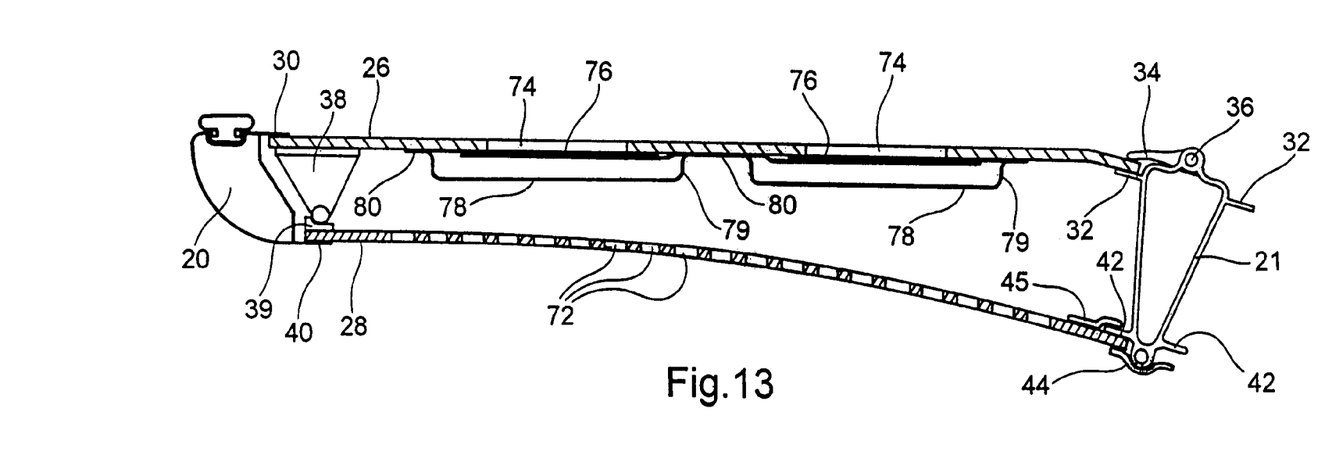
Figure 14:
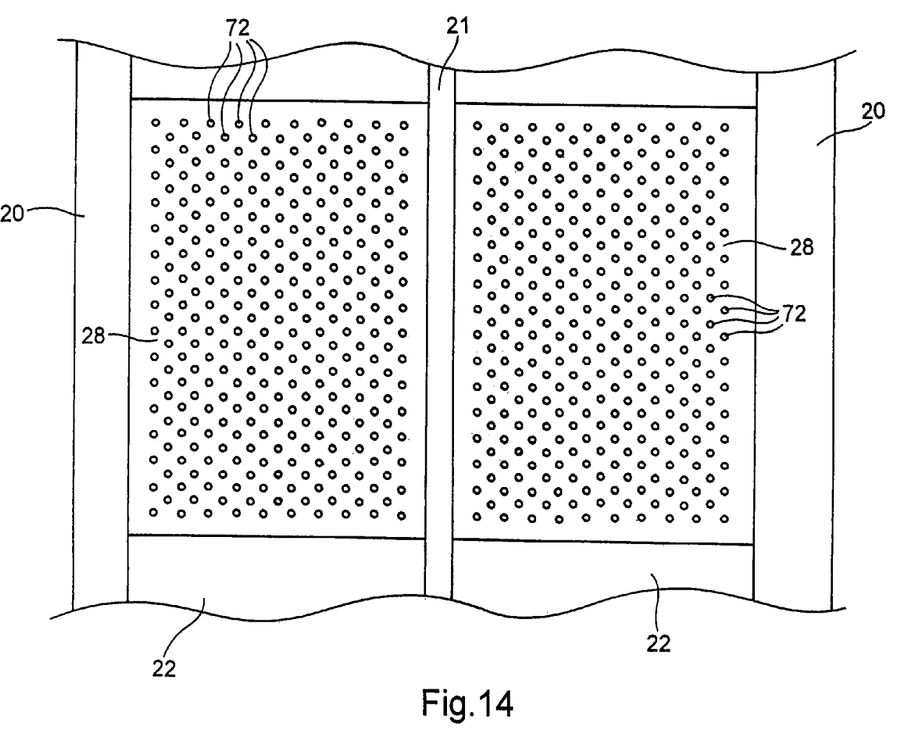
FIG. 14 shows a front view of a two-panel assembly such as those shown on FIGS. 12 and 13.

FIGS. 12 to 14 show how air can circulation from the front to the back of the plane through second door 12. These figures show in greater detail the structure of front plates 26 and rear plates 28 of panels 18.

To enable air flow, rear plate 28 is shown, in the preferred form of manufacturing shown on the drawing, in the form of a grill such as is shown by FIG. 14. Holes 72 are regularly distributed over the full surface area (except maybe near the edges) of rear plate 28.

Front plate 26 is equipped with low pressure check valves. As such, one can provide for two valves per panel 18 as is suggested on FIGS. 12 and 13. At each valve, a cutout 74 is made in front plate 26. Each cutout 74 is fully covered with an elastic membrane 76 that is impervious to air. A cover 78 with an outer skirt 79 and an edge 80 comes and recovers elastic membrane 76. This cover 78 is secured to the inside face of front plate 26 at its edge 80. The external contour of elastic membrane 76 is partially sandwiched between this edge 80 and inner plate 26. If elastic membrane 76 and cover 78 for instance are rectangular, one can provide for instance that two opposite edges of elastic membrane 76 are retained by edge 80 of cover 76 while the other two edges of elastic membrane 78 are free. Cover 78 extends in parallel to inner plate 26, at a distance thereof. Openings are provided in this cover, for instance at outer skirt 79 to permit air flow.

FIG. 13 shows the check valves in their closed position. When an air flow arrives from the outside, in other words, an air flow that is moving from the back to the front of the plane, it pushes elastic membrane 76 against front plate 26 thus obstructing the corresponding cutout 74. On the other hand, as is shown in FIG. 12, when the air flow comes from the inside, in other words, an air flow circulating from the front (aisle 8) to the back (cabin 14) of the plane, elastic membrane 76 is lifted from the inner face of front plate 26 and is pushed towards cover 78. As such, air can pass through cutout 74, the free edges of elastic membrane 76, the openings made in cover 78 and then through holes 72 of rear plate 28.

These check valves are used among other to permit ventilation to the area reserved for the crew and served by aisle 8. They are also used during the closing of second door 12 to prevent over-pressurizing the aisle which would hamper considerably the closing of this second door 12. These valves can also be used in the event of a depression in cabin 14. Then, air can pass from aisle 8 to cabin 14.

It has been calculated that pressure variations at second door 12 during a depression in cabin 14 were considerably less than at cockpit door 10. Moreover, this difference in pressure diminishes rapidly, so that second door 12 can remain closed in case of depression in cabin 14 without hampering the operation of cockpit door 10.

For instance, elastic membrane 76 is made of polyurethane. To collect the electrical charges from the static power sources during their passing through the check valves, one can provide to serigraph a network, in copper for instance, on each of elastic membranes 76 on the side of window 74. This network is then for instance connected electrically to link 48 that itself is electrically connected through rear plate 28 and link 50 to metallic frame 16 of second door 12.

In a preferred form of manufacturing, it is also provided to filter the air passing through the check valves. A foam filter can then for instance be placed over cover 78 of each valve. It is also possible to provide a filter on the inner face (rather than on the outer face) of rear plate 28, a filter that then covers holes 72 of this plate.

Figures 10, 11:
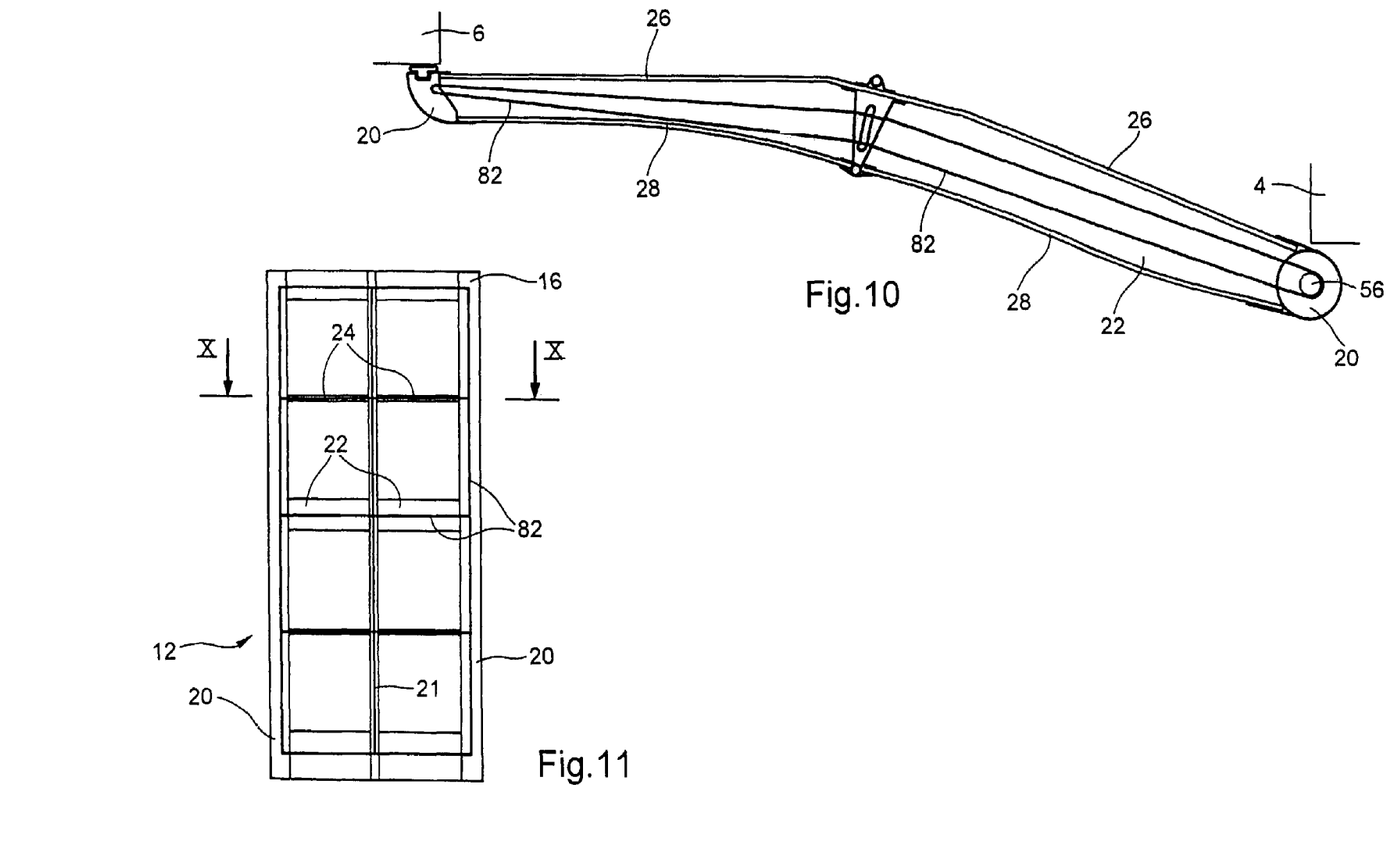
FIG. 10 is a sectional view according to the sectional line X-X of FIG. 11.
FIG. 11 is a front view corresponding to FIG. 2 showing a structural reinforcement for the door of FIG. 2.

FIGS. 10 and 11 represent a complementary system that permits reinforcing second door 12. This system consists of a reinforcement 82 that reinforces the structure of frame 16. This reinforcement 82 links the main constituents of the frame to link them even more one to the other. This reinforcement 82 is constituted for instance of harnesses glued on the components of the frame to link them. These harnesses are preferably made of carbon fibers. They are arranged on frame 16 so as to form a network comparable to webbing. As such, links are provided among the various harnesses. The latter are shown in the form of strips laid out along posts 20, 21, torsion boxes 22 and cross-struts 24 so as not to hamper the ejection of panels 18 in case of depression inside the cockpit.

Reinforcement 82 is preferably made of carbon fibers. Here, this material has several advantages. First of all, it mechanical strength permits reinforcing the structure of frame 16 of second door 12. Then, harnesses made of this material are relatively light and as such do not weigh down the structure of second door 12. Carbon fiber harnesses are also very difficult to cut. As such, in case of an attack, if a person attempts to push in second door 12 with force, reinforcement 82 then forms a very cumbersome webbing for the assailant. The presence of this webbing permits increasing the time necessary for this assailant to go through this second door 12. This additional time can be precious for the crew members, who in case of attack, can then take refuge in cockpit 2 that is secured.

Second door 12 described above in this mode of preferred manufacture permits creating a private space for the crew members and prevent passengers from seeing the cockpit door. This second door 12 also isolates the private space of the navigating personnel thanks to its double barrier structure. The free space between the two plates of each panel permits achieving good sound insulation.

Second door 12 also forms a barrier to delay access to the cockpit to a terrorist who wants to take control of the plane. This second door does not hamper operation of the cockpit door in case of depression inside the plane cabin or inside its cockpit.

This second door 12, as shown above, can be made of a light structure—light alloy door frame, compound panels—and as such presents an acceptable excess load in the aircraft.

Needless to say, such a door is equipped with means that permit keeping it in its closed position as well as in the open position. This door is also beneficially equipped with means to bring it back to its closed position. As such, as soon as the door is in an intermediate position between its open and closed position, it closes automatically. Such means are known to the technical man in the field and are not described here. For greater security, it is also possible to provide an access code to be able to open this door. Other means of acknowledgement (badge, etc.) can also be provided. Such a door can also be equipped with surveillance means enabling members of the crew on one side of the closed door to check the cabin.

When the second door is equipped with air flow valves, one has seen that rear plates 28 of the panels 18 were perforated. These perforations can be used for door esthetics. Indeed, rear plates 28 are located on the side of the aircraft cabin and are seen by the passengers. For instance, it is possible to provide for lighting between the two plates forming each panel to back-light the perforations of the rear plate. These perforations can then be arranged according to a particular pattern (drawing, airline logo, letters, etc.).

As it appears from all of the above, the door described above can meet numerous criteria:
- in case of depression inside the cockpit, it permits equalizing pressures;
- in case of depression inside the cabin, it also permits equalizing pressures;
- this door is designed to stay together in case of very high mechanical stresses;
- the weight of this door is relatively light;
- this door can be equipped with classic closing devices;
- surveillance systems (spy hole, camera, etc.) can be provided;
- this door can close automatically;
- this door can lock automatically;
- this door provides navigating personnel with a private space separate from the rest of the cabin;
- it is possible to create an esthetic door that integrates well with the rest of the cabin.

This invention is not limited to the preferred form of manufacturing described above provided as a non-limiting example. It also covers all variations of manufacture within the scope of the technical expert within the framework of the following claims.

The invention claimed is:

1. A reinforced door for an aircraft, comprising:
a frame comprised of a plurality of components, the frame including a plurality of openings extending completely through the frame;
a plurality of panels configured to be positioned within the openings of the frame, and, when the panels are in an installed position, at least a first edge and a second edge, which is opposite to the first edge, of each of the plurality of panels contact the components of the frame such that the frame and the plurality of panels form a solid structure without any of the openings extending completely through the structure, and the panels are configured to be released to an uninstalled position such that, when the panels are in the uninstalled position, each of the plurality of panels is not positioned within the openings of the frame such that the openings extend completely through the structure; and a plurality of harnesses, linking a majority of the components, and the plurality of harnesses are positioned on the components to reinforce the frame without contacting the plurality of panels in the installed position, wherein each of the plurality of harnesses is directly attached to at least one other harness of the plurality of harnesses, and wherein each of the plurality of harnesses is completely overlapped by the components of the frame in a transverse direction of the reinforced door such that the plurality of harnesses do not extend outside of the components in the transverse direction.

2. The reinforced door according to claim 1, wherein the harnesses include strips glued onto the components.

3. The reinforced door according to claim 1, wherein the harnesses include high resistance composite fibers.

4. The reinforced door according to claim 3, wherein the harnesses include carbon fiber.

5. The reinforced door according to claim 1, wherein the frame includes at least three vertical posts each extending from a top edge of the door to a bottom edge of the door, and the at least three vertical posts are linked by linkage pieces laid out horizontally.

6. The reinforced door according to claim 5, wherein the harnesses are laid out over a majority of a length of the vertical posts and over an entire length of the horizontal linkage pieces.

7. The reinforced door according to claim 1, wherein the panels are configured to release away from the frame during a decompression such that none of the panels are in contact with the frame.

8. The reinforced door according to claim 1, further comprising:

latches configured to hold the panels to the frame and to release the panels during a decompression in part of the aircraft.

9. The reinforced door according to claim 8, further comprising:

linking members, connected to the panels, configured to link the panels to the frame before and after the panels are released from the frame.

10. An aircraft comprising:

a cockpit area in a front portion of the aircraft;

a cabin area in a rear portion of the aircraft; and the reinforced door according to claim 1 dividing the cockpit area and the cabin area.

11. An aircraft comprising:

a cockpit area in a front portion of the aircraft;

a cabin area in a rear portion of the aircraft;

an aisle area between the cockpit area and the cabin area;

a first door dividing the cockpit area and the aisle area; and the reinforced door according to claim 1 dividing the aisle area and the cabin area.

* * * * *